United States Patent Office 3,208,992
Patented Sept. 28, 1965

3,208,992
ACRYLOYLAMINO BENZENE MONOAZO DYESTUFFS
Francis Bowman and Peter William Hickmott, Manchester, England, assignors to Imperial Chemical Industries Limited, London SW. 1, England, a corporation of Great Britain
No Drawing. Filed Dec. 21, 1962, Ser. No. 246,358
Claims priority, application Great Britain, Jan. 10, 1962, 977/62
1 Claim. (Cl. 260—162)

This invention relates to new azo dyestuffs and more particularly it relates to new monoazo and disazo dyestuffs which are valuable for colouring textile materials, in particular woollen textile materials.

According to the invention there are provided the azo dyestuffs which are represented by the formula:

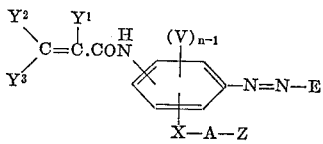

wherein $Y^1$, $Y^2$ and $Y^3$ each independently represent a hydrogen or a chlorine atom, V represents a lower alkyl or a lower alkoxy radical, $n$ represents 1 or 2, E represents the residue of a coupling component, X represents a direct link or a

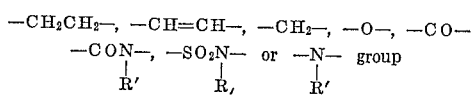

wherein R' represents a hydrogen atom or a lower alkyl radical, A represents a substituted or unsubstituted divalent hydrocarbon radical containing at least 5 carbon atoms, or when X represents

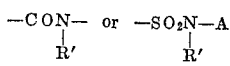

and R' can together form with the nitrogen N a 6-membered heterocyclic ring, and Z represents a hydrogen atom or a

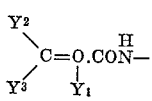

group, as hereinbefore defined, provided that the dyestuffs contain at least one sulphonic acid or carboxylic acid group attached to at least one of A and E.

A preferred class of the dyestuffs are the dyestuffs of the above formula wherein $Y^1$, $Y^2$ and $Y^3$ each represent a hydrogen atom. It is further preferred that the dyestuffs contain only one sulphonic acid group which is attached to E.

The residue of the coupling component represented by E may be the residue of any of the known series of coupling components (that is to say a compound which will react with a diazonium compound to form an azo dyestuff), but E is preferably the residue of a coupling component of the phenol, naphthol, acylacetarylamide, arylamine, 5-aminopyrazole or 5-pyrazole series. The coupling components of the acylacetarylamide series are preferably acetoacetanilides. The coupling components of the arylamine series may be primary, secondary or tertiary amines of the benzene series which couple in para position to a primary, secondary or tertiary amino group, and, above all, are primary amines of the naphthalene series which couple in para or preferably ortho position to a primary amino group. The coupling components of the 5-aminopyrazole series are preferably 1-aryl-5-aminopyrazoles in particular 1-phenyl-5-aminopyrazoles. The coupling components of the 5-pyrazolone series are preferably 1-aryl-5-pyrazolones in particular 1-phenyl-5-pyrazolones or 1-naphthyl-5-pyrazolones. If desired the coupling components represented by E may contain substituents attached to aryl rings, in particular benzene or naphthalene rings, present in the said components; and as examples of such substituents there may be mentioned chlorine atoms, lower alkyl radicals, lower alkoxy radicals and nitro, cyano, lower alkylsulphone such as methylsulphone and ethyl sulphone, suphonamide and substituted sulphonamide groups such as N-lower alkyl sulphonamide, N:N-di(lower alkyl) sulphonamide, N-(hydroxy lower alkyl)sulphonamide and N:N-di-(hydroxy lower alkyl)sulphonamide groups for example sulphon-N-methylamide, sulphon-N-ethylamide, sulphon-N-propylamide, sulphon-N-(β-hydroxyethyl)amide, sulphon-N:N-di(β-hydroxyethyl)amide, sulphon-N:N-dimethylamide, sulphon-N:N-diethylamide and sulphon-N:N-dipropylamide groups, acylamino groups such as acetylamino, propionylamino, benzoylamino, benzenesulphonylamino, p-toluenesulphonylamino, carbomethoxyamino, carboethoxyamino, carbopropoxyamino and

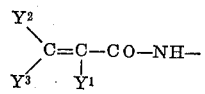

groups, wherein $Y^1$, $Y^2$ and $Y^3$ have the meanings stated, primary amino groups, N-lower alkylamino groups, phenylamino groups, sulphonic acid groups, carboxylic acid groups, and arylazo groups in particular substituted or unsubstituted phenylazo or naphthylazo groups.

It is however preferred that the residues of the coupling components represented by E contain at least one sulphonic acid group.

Throughout the specification the term "lower alkyl" or "lower alkoxy" is used to denote an alkyl or alkoxy radical respectively of low molecular weight, in particular an alkyl or alkoxy radical respectively containing from 1 to 4 carbon atoms; and as examples of such alkyl radicals there may be mentioned methyl, ethyl, propyl and butyl radicals, and as examples of such alkoxy radicals there may be mentioned methoxy and ethoxy radicals.

As examples of 6-membered heterocyclic rings which may be obtained by joining together A, R' and the nitrogen atom N there may be mentioned piperidine, morpholine and piperazine rings.

As examples of the substituted or unsubstituted divalent hydrocarbon radicals represented by A there may be mentioned substituted or unsubstituted alkylene radicals containing at least 5 atoms, for example, pentamethylene, dimethyltrimethylene, hexamethylene, heptamethylene, octamethylene, nonamethylene, 1:1:3:3-tetramethyl-tetramethylene, decamethylene and dodecamethylene radicals, divalent cyclic aliphatic radicals such as divalent cyclopentane, cyclohexane, and methylcyclopentane radicals, and substituted and unsubstituted divalent aromatic radicals, which are preferably monocyclic aromatic radicals, such as phenylene, tolylene, methoxyphenylene, chlorophenylene, bromophenylene, sulphophenylene and carboxyphenylene radicals.

It is however preferred that A represents a substituted or unsubstituted phenylene radical.

According to a further feature of the invention there is provided a process for the manufacture of the azo dyestuffs, as hereinbefore defined, which comprises treating with an acylating agent, such as the acid halide, derived from an acid of the formula:

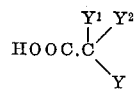

Formula I wherein $Y^1$, $Y^2$ and $Y^3$ have the meanings stated above, an azo compound of the formula:

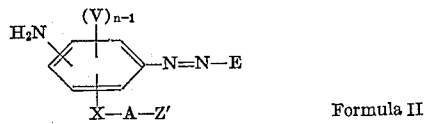

Formula II wherein A, V, E, $n$ and X have the meanings stated above, and Z' represents a hydrogen atom, a —NH$_2$ or a

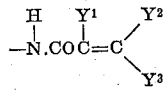

group, wherein $Y^1$, $Y^2$ and $Y^3$ have the meanings stated above, provided that the azo compounds of Formula II contain at least one sulphonic acid or carboxylic acid group.

This process of the invention may be conveniently brought about by adding the acylating agent to an aqueous solution of the azo compound, stirring the resulting mixture, preferably at a temperature between 0° and 20° C., whilst maintaining the pH of the mixture between 6 and 7 by the addition of an acid-binding agent such as sodium carbonate or sodium acetate, adding sodium chloride and isolating the azo dyestuff which is precipitated.

As examples of acylating agents which may be used in this process of the invention there may be mentioned α-chloroacryloyl chloride, β-chloroacryloyl chloride, acryloyl bromide, β:β-dichloroacryloyl chloride, α:β:β-trichloroacryloyl chloride and preferably acryloyl chloride.

The azo compounds of Formula II used in this process of the invention may themselves be obtained by diazotising an amine of the formula:

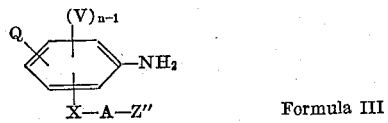

Formula III wherein A, V, $n$ and X have the meanings stated above, Q represents a nitro group or an acetylamino group, and Z'' represents a hydrogen atom, a nitro group, an acetylamino group or

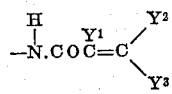

group, as hereinbefore defined, coupling the diazo compound so obtained with a coupling component of the formula E—H, and finally converting the nitro or acetylamino group represented by Q or Z to an amino group by reduction or by hydrolysis, provided that the amine of Formula II and the coupling component are so chosen that the resulting azo compound contains at least one sulphonic acid or carboxylic acid group.

As examples of amines of Formula III which may be used to obtain the azo compounds of Formula II there may be mentioned 5-nitro-2-aminobenzenesulphon-N-ethylanilide,
5-nitro-2-aminobenzenesulphonanilide,
5-acetylamino-2-aminobenzenesulphon-N-ethylanilide,
2-nitro-4-aminodiphenyl,
2-nitro-4-aminodiphenylamine,
5-nitro-2-aminodiphenyl,
2-amino-4:4'-bis(acetylamino)diphenyl,
2-amino-4-acetylaminodiphenyl and
N-acetyl-N'-(2 - amino-5-nitrobenzenesulphonyl) - piperazine.

As examples of coupling components of the formula: E—H there may be mentioned phenols such as p-cresol, 4-acetylaminophenol, resorcinol, 1-hydroxycarbazole-3:6-disulphonic acid and 2-hydroxycarbazole-3:6:8-trisulphonic acid, naphthols such as 1-naphthol, 1-naphthol-2-, 4-, or 5-sulphonic acid, 1-naphthol-3:6- or -3:8-disulphonic acid, 1-naphthol-3:6:8-trisulphonic acid, 2-naphthol, 2-naphthol-6-, 7- or 8-sulphonic acid, 2-naphthol-3:6- or -6:8-trisulphonic acid, 1-amino-8-naphthol-2:4-, -3:6 or -4:6-disulphonic acid and the N-lower alkyl, N-aryl and N-acyl derivatives thereof, 2-amino-8-naphthol-6-sulphonic acid and the N-lower alkyl, N-aryl and N-acyl derivatives thereof, 2-amino-5-naphthol-7-sulphonic acid and the N-lower alkyl, N-aryl and N-acyl derivatives thereof, 2 - amino-8-naphthol-3:6-disulphponic acid, 2-amino-5-naphthol-1:7-disulphonic acid, 1-amino-8-naphthol-4-sulphonic acid, 1-amino-5-naphthol-7-sulphonic acid, N-(7-sulpho-5-hydroxynaphth-2-yl)piperazine and N-(6 - sulpho-8-hydroxynaphth-2-yl) - piperazine; arylamines for example N:N-dimethylaniline, N:N-diethylm - toluidine, m-toluidine, N:N-di(β-hydroxyethyl)-m-toluidine, 1-naphthylamine-6- or 7-sulphonic acid, 2-methoxy-1-naphthylamine-6-sulphonic acid, 2 - methyl-aminonaphthalene-7- sulphonic acid, 2-amino-8-naphthol-6-sulphonic acid, 2-naphthylamine-6-, 7- or 8-sulphonic acid, 2-naphthylene-3:7-, 4:8-, 5:7- or 6:8-disulphonic acid and the N-lower alkyl, N-aryl and N-acyl derivatives thereof, 2-naphthylamino-5- or 6-sulphonamide and 1-naphthylamine-7-sulphomethylamide; acylacetarylamides for example acetoacetanilide, acetoacetanilide-3- or 4-sulphonic acid, acetoacet-3- or 4-aminoanilide, acetoacet-o-m- or p-anisidide and acetoacet-o- or p-chloroanilide; 5-amino-pyrazoles for example 1-phenyl-3-methyl-5-aminopyrazole; and 5-pyrazolones such as 1:3-dimethyl-5-pyrazolone, but more particularly 1-aryl-5-pyrazolones such as 1-phenyl-3-methyl-5-pyrazolone, 1-phenyl-3-carboxy-5-pyrazolone, 1-(2'-, 3'- or 4'-sulphophenyl)-3-methyl-5-pyrazolone, 1-(2':4'- or 2':5'-disulphophenyl)-3-methyl-5-pyrazolone, 1-(3'- or 4'-aminophenyl)-3-methyl-5-pyrazolone, 1-(3'- or 4'-aminophenyl)-3-carboxy-5-pyrazolone, 1-(3'-amino-4'-sulphophenyl)-3-methyl-5pyrazolone, 1-(4'-amino-3'-sulphophenyl)-3-methyl - 5 - pyrazolone, 1-(5' - hydroxy - 7' - sulpho-2'-naphthyl)-3-methyl-5-pyrazolone and 1 - (8' - hydroxy-6'-sulpho-2'-naphthyl) - 3-methyl-5-pyrazolone.

According to a further feature of the invention there is provided an alternative process for the manufacture of the new azo dyestuffs, as hereinbefore defined, which comprises diazotising an amine of the formula:

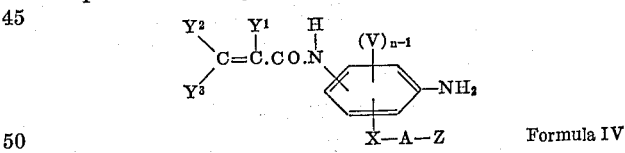

Formula IV wherein A, V, X, $Y^1$, $Y^2$, $Y^3$, $n$ and Z have the meanings stated above, and coupling the diazo compound so obtained with a coupling component of the formula: E—H wherein E has the meaning stated above, the amine and the coupling component being so chosen that the resulting azo dyestuff contains at least one sulphonic acid or carboxylic acid group.

This alternative process of the invention may be conveniently brought about by adding sodium nitrite to an aqueous solution or suspension of the amine in a dilute aqueous solution of hydrochloric acid, adding the resulting aqueous solution or suspension of the diazo compound to an aqueous solution of the coupling component, stirring the resulting mixture to effect formation of the azo dyestuff, and isolating by conventional methods, the azo dyestuff which is formed.

The amines of Formula IV used in this alternative process of the invention may themselves be obtained by treating a compound of the fomula:

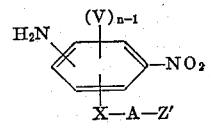

wherein A, V, n, X and Z' have the meanings stated above, with an acylating agent derived from an acid of Formula I, and subsequently reducing the nitro group to an amino group.

As specific examples of amines of Formula IV which can be used in the alternative process of the invention there may be mentioned 2 - amino-4:4'-bis(acryloylamino)diphenyl, 2 - amino-4:4'-bis(acryloylamino)diphenylmethane, 2 - amino-4:4'-bis(acryloylamino)-5:5'-dimethyldiphenyl, 2 - amino - 3' - bromo-4:4'-bis(acryloylamino)diphenyl, 4-amino-2:4'-bis(acryloylamino)diphenylamine, 2 - amino - 4:4'-bis(acryloylamino)-5:5'-dimethoxy-diphenyl, 2 - amino-4:4'-bis(acryloylamino)diphenylmethane, 2-amino-4:4'-bis(acryloylamino)stilbene, 2-amino-4-acryloylaminostilbene, 3 - amino - 5 - acryloylaminobenzanilide, 3 - amino - 5 - acryloylaminobenz-N-methylanilide, 3 - amino - 5 - acryloylaminobenz-N-ethylanilide, 2 - amino - 4 - acryloylaminobenzanilide, 2-amino-4-acryloylaminobenz - N - ethylanilide, 2-amino-4:4'-bis-(acryloylamino)benzanilide, 3 - amino - 5 - acryloyl-amino - 2':4':6' - trimethylbenzophenone, 2-amino-4-acryloylaminobenzene sulphon-N-ethylanilide, 2-amino-4 - acryloylaminobenzene sulphon-N-ethyl-3'-sulphoanilide and 2 - amino-4-acryloylaminobenzene sulphon-N-methyl-3'-sulphoanilide.

As examples of coupling components which can be used in the alternative process of the invention there may be mentioned any of the coupling components previously disclosed in the specification and, in addition, there may be used 2 - acryloylamino-8-naphthol-6-sulphonic acid, 2 - acryloylamino-8-naphthol-3:6-disulphonic acid, 2-acryloylamino - 5 - naphthol-7-sulphonic acid, 2-acryloyl-amino-5-naphthol-1:7-disulphonic acid, 2-acryloylamino-6 - naphthylamine, acetoacet - 3 - or 4-(acryloylamino)-anilide, 1-[3'- or 4'-(acryloylamino)phenyl]-3-methyl or carboxy - 5 - pyrazolone, 1-[3'-sulpho-4(acryloylamino)-phenyl]-3-methyl-5-pyrazolone and 1-[4'-sulpho-3'-(acryloylamino)phenyl]-3-methyl-5-pyrazolone.

One preferred class of the azo dyestuffs of the invention are the monoazo dyestuffs which, in the form of the free acids, are represented by the formula:

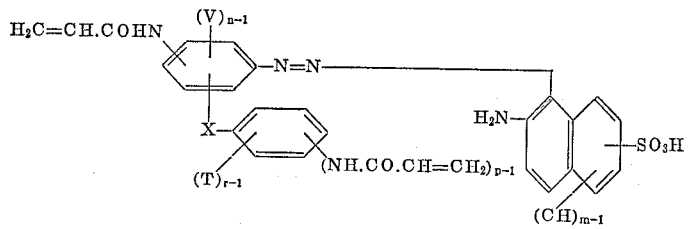

wherein X has the meaning stated above, V represents a lower alkyl or lower alkoxy group, T represents a methyl, methoxy or sulphonic acid group, and n, m, p and r each independently represent 1 or 2.

A second preferred class of the azo dyestuffs of the invention are the monoazo dystuffs which, in the form of the free acids, are represented by the formula:

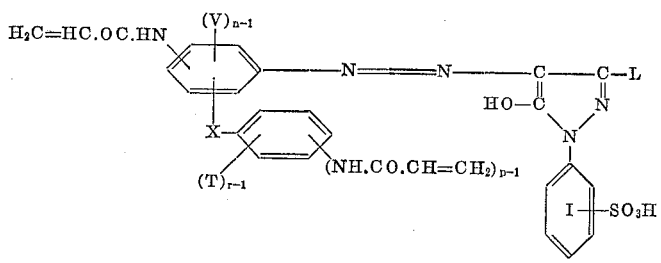

wherein X, V, T, n, r and p have the meanings stated, L represents a methyl or carboxy group, and the benzene ring I can optionally be substituted by chlorine atoms or by methyl or acryloylamino groups.

The new azo dyestuffs of the invention are valuable for colouring natural and artificial textile materials for example textile materials comprising cotton, viscose rayon, regenerated cellulose, wool, silk, polyamides and modified polyacrylonitrile fibres. For this purpose the dyestuffs can be applied to the textile materials by dyeing, padding or printing using in the latter case printing pastes containing the conventional thickening agents or oil-in-water or water-in-oil emulsions, whereby the textile materials are coloured in bright shades possessing excellent fastness to wet treatments such as washing.

The new azo dyestuffs may be used as "reactive" dyestuffs for colouring cellulose textile materials. For this purpose the dyestuffs are preferably applied to the cellulose textile material in conjunction with a treatment with an alkaline agent, for example sodium carbonate or bicarbonate, sodium metasilicate, trisodium phosphate or sodium hydroxide which may be applied to the cellulose textile material before, during or after the application of the dyestuff. Alternatively when the dyed textile material is to be subsequently heated or steamed a substance, such as sodium trichloroacetate, which becomes alkaline on heating or steaming, can be used.

The new azo dyestuffs of the invention are particularly valuable for colouring nitrogen-containing textile materials, for example polyamide textile materials but, more particularly, woollen textile materials.

The new azo dyestuffs of the invention can be applied to nitrogen-containing textile materials from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, nonionic dispersing agents such as condensates of ethylene oxide with amines, fatty alcohols or phenols, surface-active agents such as quaternary ammonium salts for example cetyl trimethylammonium bromide and cetyl pyridinium bromide and organic liquids such as n-butanol and benzyl alcohol.

When so applied to woollen textile materials the dyestuffs build up well to give level dyeings which have excellent fastness to light and to wet treatments such as alkaline milling, potting, neutral cross dyeing, acid-cross dyeing, and prolonged or repeated washing, combined with good neutral affinity.

The invention is illustrated but not limited by the following examples in which the parts and percentages are by weight.

Example 1

A solution of 7.5 parts of the monosodium salt of 1-[4'-amino - 2' - (N-ethyl-N-phenylsulphamyl)phenylazo]-2-amino-8-naphthol-6-sulphonic acid in a mixture of 300 parts of water and 300 parts of acetone is cooled to 5° C., and 12 parts of acryloyl chloride are then added during 30 minutes, the pH of the mixture being maintained at 7 by the simultaneous gradual addition of an aqueous solution of sodium carbonate. The resulting mixture is stirred for 3 hours at a temperature between 5° and 10° C., 80 parts of sodium chloride are then added and the precipitated dyestuff is filtered off, washed with a 5% aqueous solution of sodium chloride and dried.

When applied to woollen textile materials from a neutral or slightly acid dyebath the dyestuff yields bluish-red shades which possess excellent fastness to light and to wet treatments.

The monosodium salt of the azo compound used in the above example may itself be obtained by diazotising 5-nitro-2-aminobenzene sulphon-N-ethylanilide, coupling the resulting diazo compound with 2-amino-8-naphthol-6-sulphonic acid in aqueous medium at a pH of 5, and finally treating the resulting compound with a hot aqueous solution of sodium sulphide to reduce the nitro group to an amino group.

Example 2

A solution of 1.5 parts of 2-amino-4:4'-bis(acryloylamino)-diphenyl in 50 parts of acetic acid is added to a stirred mixture of 100 parts of water, 100 parts of ice and 5 parts of a concentrated aqueous solution of hydrochloric acid, 3.3 parts of a 2% aqueous solution of sodium nitrite are then added and the resulting mixture is stirred for 1 hour at a temperature between 0° and 5° C. Sulphamic acid is added to destroy any excess nitrous acid which is present, and a solution of 2 parts of the monosodium salt of 2-amino-8-naphthol-6-sulphonic acid in 100 parts of water is then added. The pH of the mixture is adjusted to 5.0 and the mixture is then stirred for 18 hours at 0° to 5° C. The precipitated dyestuff is then filtered off, washed with a 10% aqueous solution of sodium chloride and dried.

When applied to woollen textile materials from a neutral or slightly acid dyebath the dyestuff yields bright yellowish-red shades which possess excellent fastness to light and to wet treatments.

The 2-amino-4:4'-bis(acryloylamino)-diphenyl used in the above example may be obtained as follows:

28 parts of acryloyl chloride are added over 2 hours to a solution of 13 parts of 2-nitrobenzidine in a mixture of 400 parts of acetone and 100 parts of water at a temperature between 0° and 5° C., a 40% aqueous solution of sodium acetate being simultaneously added to maintain the mixture neutral to Congo red. The resulting mixture is then stirred for 3 hours, and the precipitated 2-nitro-4:4'-bis(acryloylamino)-diphenyl is filtered off, washed with a 50% aqueous solution of acetone and finally dried.

A mixture of 7.95 parts of iron, 19 parts of ethanol, 4.75 parts of water and 0.2 part of formic acid is stirred at the boil under a reflux condenser for 30 minutes. A suspension of 5 parts of 2-nitro-4:4'-bis(acryloylamino)-diphenyl in 2.0 parts of boiling ethanol is then added and the resulting mixture is stirred for 15 hours at the boil under a reflux condenser. 0.22 part of sodium carbonate, 0.22 part of a 40% aqueous solution of sodium bisulphite and 100 parts of ethanol are then added, the mixture is heated to the boiling point and filtered. The residue on the filter is washed with 100 parts of hot ethanol, and the combined filtrates are then evaporated to dryness in a vacuum when 2-amino-4:4'-bis(acryloylamino)-diphenyl is obtained in the form of a white powder which melts at 225° C. with decomposition and subsequent resolidification.

The following table gives further examples of the new dyestuffs of the invention which are obtained when the sodium salts of the azo compounds listed in the second column of the table are treated with the acid chlorides listed in the third column of the table by a method similar to that described in Example 1. The fourth column of the table gives the shades obtained when the resulting dyestuffs are applied to woollen textile materials.

| Example | Azo Compound | Acid Chloride | Shade |
|---|---|---|---|
| 3 | 1-[4'-amino-2'-(N-ethyl-N-phenylsulphamyl)phenylazo]-2-naphthylamine-6-sulphonic acid. | Acryloyl chloride | Scarlet. |
| 4 | do | α-chloroacryloyl chloride | Do. |
| 5 | 1-[4'-amino-2'-(N-phenylsulphamyl)phenylazo]-2-amino-8-naphthol-6-sulphonic acid. | Acryloyl chloride | Bluish-red. |
| 6 | 1-[4'-amino-2'-(N-piperidinosulphamyl)phenylazo]-2-amino-8-naphthol-6-sulphonic acid. | do | Do. |
| 7 | 1-[4'-amino-2'-(N-ethyl-N-phenylsulphamyl)phenylazo]-2-amino-8-naphthol-6-sulphonic acid. | α-chloroacryloyl chloride | Do. |
| 8 | do | β-chloroacryloyl chloride | Do. |
| 9 | do | α:β:β-trichloro-acryloyl chloride | Do. |
| 10 | 1-[4'-amino-2'-(N-phenylsulphamyl)phenylazo]-2-amino-8-naphthol-6-sulphonic acid. | do | Do. |
| 11 | 1-[3'-amino-4'-(phenoxy)phenylazo]-2-amino-8-naphthol-6-sulphonic acid. | Acryloyl chloride | Bordeaux. |
| 12 | 1-[3'-amino-4'-(phenoxy)phenylazo]-2-naphthylamine-6-sulphonic acid. | do | Yellowish-orange. |

The following table gives further examples of the new dyestuffs of the invention which are obtained by diazotising the amines listed in the second column of the table and coupling the resulting diazo compounds with the coupling components listed in the third column of the table by methods similar to that described in Example 2. The fourth column of the table lists the shades obtained when the resulting dyestuffs are applied to woollen textile materials.

| Example | Amine | Coupling Component | Shade |
|---|---|---|---|
| 13 | 2-amino-4:4'-bis(acryloylamino)diphenyl | 2-naphthylamine-6-sulphonic acid | Yellowish-orange. |
| 14 | ...do... | 2-naphthylamine-5-sulphonic acid | Do. |
| 15 | ...do... | 2-naphthylamine-7-sulphonic acid | Do. |
| 16 | 2-amino-4:4'-bis(acryloylamino)diphenylmethane | 2-amino-8-naphthol-6-sulphonic acid | Yellowish-red. |
| 17 | ...do... | 2-naphthylamine-5-sulphonic acid | Yellowish-orange. |
| 18 | ...do... | 2-naphthylamine-6-sulphonic acid | Do. |
| 19 | ...do... | 2-naphthylamine-7-sulphonic acid | Do. |
| 20 | 2-amino-4:4'-bis(acryloylamino)diphenylethane | 2-amino-8-naphthol-6-sulphonic acid | Yellowish-red. |
| 21 | ...do... | 2-naphthylamine-5-sulphonic acid | Yellowish-orange. |
| 22 | ...do... | 2-naphthylamine-6-sulphonic acid | Do. |
| 23 | ...do... | 2-naphthylamine-7-sulphonic acid | Do. |
| 24 | 2-amino-4:4'-bis(acryloylamino)stilbene | 2-amino-8-naphthol-6-sulphonic acid | Bluish-red. |
| 25 | ...do... | 2-naphthylamine-6-sulphonic acid | Reddish-orange. |
| 26 | 2-amino-4-acryloylaminostilbene | 2-amino-8-naphthol-6-sulphonic acid | Bluish-red. |
| 27 | ...do... | 2-naphthylamine-6-sulphonic acid | Yellowish-orange. |
| 28 | 2-amino-4:4'-bis(acryloylamino)-5:5'-dimethyldiphenyl | ...do... | Do. |
| 29 | ...do... | ...do... | Do. |
| 30 | 3-amino-5-acryloylamino-2':4':6'-trimethylbenzophenone | 2-amino-8-naphthol-6-sulphonic acid | Yellowish-red. |
| 31 | ...do... | ...do... | Do. |
| 32 | 3-amino-5-acryloylaminobenzanilide | 2-naphthylamine-6-sulphonic acid | Orange. |
| 33 | 3-amino-5-acryloylaminobenz-N-ethylanilide | 2-amino-8-naphthol-6-sulphonic acid | Yellowish-red. |
| 34 | ...do... | ...do... | Do. |
| 35 | 2-amino-4-acryloylaminobenzanilide | 2-naphthylamine-6-sulphonic acid | Yellowish-orange. |
| 36 | ...do... | ...do... | Do. |
| 37 | ...do... | 2-naphthylamine-5-sulphonic acid | Do. |
| 38 | ...do... | 2-naphthylamine-7-sulphonic acid | Do. |
| 39 | 2-amino-4-acryloylaminobenz-N-ethylanilide | 2-amino-8-naphthol-6-sulphonic acid | Yellowish-red. |
| 40 | ...do... | ...do... | Do. |
| 41 | ...do... | 2-naphthylamine-5-sulphonic acid | Yellowish-orange. |
| 42 | ...do... | 2-naphthylamine-6-sulphonic acid | Do. |
| 43 | 2-amino-4-acryloylaminobenz-N-methylanilide | 2-naphthylamine-7-sulphonic acid | Do. |
| 44 | 2-amino-4:4'-bis(acryloylamino)benzanilide | 2-amino-8-naphthol-6-sulphonic acid | Yellowish-red. |
| 45 | ...do... | ...do... | Do. |
| 46 | ...do... | 2-naphthylamine-5-sulphonic acid | Yellowish-orange. |
| 47 | ...do... | 2-naphthylamine-6-sulphonic acid | Do. |
| 48 | 2-amino-4-acryloylaminobenzene sulphon-N-ethylanilide | 2-naphthylamine-7-sulphonic acid | Do. |
| 49 | ...do... | ...do... | Do. |
| 50 | ...do... | 2-naphthylamine-5-sulphonic acid | Do. |
| 51 | ...do... | 2-naphthylamine-6-sulphonic acid | Do. |
| 52 | 2-amino-4-acryloylaminobenzene sulphon-N-methyl-3'-sulphoanilide | 2-amino-8-naphthol-6-sulphonic acid | Yellowish-red. |
| 53 | ...do... | ...do... | Do. |
| 54 | ...do... | 2-naphthylamine-5-sulphonic acid | Yellowish-orange. |
| 55 | ...do... | 2-naphthylamine-6-sulphonic acid | Do. |
| 56 | 2-amino-4-acryloylaminobenzene sulphon-N-ethyl-3'-sulphoanilide | 2-naphthylamine-7-sulphonic acid | Do. |
| 57 | ...do... | ...do... | Do. |
| 58 | ...do... | 2-naphthylamine-5-sulphonic acid | Do. |
| 59 | ...do... | 2-naphthylamine-6-sulphonic acid | Do. |
| 60 | 2-amino-4:4'-bis(acryloylamino)-5:5'-dimethoxydiphenyl | 2-amino-8-naphthol-6-sulphonic acid | Yellowish-red. |
| 61 | ...do... | ...do... | Red. |
|  | ...do... | 2-naphthylamine-6-sulphonic acid | Orange. |

Example 62

A solution of 7.5 parts of the monosodium salt of 1 - [4' - amino - 2' - (N - methyl - N - {3" - sulphophenyl}sulphamyl)phenylazo]-2-naphthol in a mixture of 300 parts of water and 300 parts of acetone is cooled to 5° C. and 12 parts of acryloyl chloride are then added during 30 minutes, the pH of the mixture being maintained at 7 by the simultaneous addition of an aqueous solution of sodium carbonate. The resulting mixture is stirred for 3 hours at a temperature between 5° and 10° C., 80 parts of sodium chloride are added and the precipitated dyestuff is filtered off, washed with a 5% aqueous solution of sodium chloride and dried.

When applied to woollen textile materials from a neutral or slightly acid dyebath the dyestuff yields bluish-red shades which possess excellent fastness to light and to wet treatments.

The monosodium salt of the azo compound used in the above example may itself be obtained by diazotising 5 - nitro - 2 - aminobenzenesulphon - N - methylanilide-3'-sulphonic acid, coupling the resulting diazo compound with β-naphthol in aqueous alkaline medium and finally treating the resulting compound with a hot aqueous solution of sodium sulphide to reduce the nitro group to an amino group.

The following table gives further examples of new dyestuffs of the invention which are obtained by replacing the 7.5 parts of the monosodium salt of the aminoazo compound used in Example 62 with equivalent amounts of the sodium salts of the aminoazo compounds which are obtained by coupling diazotised 5-nitro-2-aminobenzene sulphon-N-methylanilide-3'-sulphonic acid with the coupling components listed in the second column of the table and subsequently reducing the nitro group to an amino group. The third column of the table gives the shades obtained when the resulting dyestuffs are applied to woollen textile materials.

| Example | Coupling Component | Shade |
|---|---|---|
| 63 | 1-(4'-methylphenyl)-3-methyl-5-pyrazolone | Yellow. |
| 64 | 1-phenyl-3-methyl-5-pyrazolone | Do. |
| 65 | Acetoacetanilide | Greenish-yellow. |
| 66 | Acetoacet-2:4-dimethylanilide | Do. |
| 67 | 4-methylphenol | Yellow. |

Example 68

5 parts of a 2 N aqueous solution of sodium nitrite are added, with stirring, to a mixture of 4.5 parts of the monosodium salt of 2-amino-4-acryloylaminobenzene sulphon-N-ethyl-3'-sulphoanilide, 100 parts of water, 20 parts of ice and 5 parts of a concentrated aqueous solution of hydrochloric acid, and the resulting mixture is stirred for 15 minutes at 0° to 5° C. Sulphamic acid is then added to destroy any nitrous acid still present, followed by sodium acetate until the mixture is no longer acid to Congo red. The resulting mixture is then added to a solution of 1.74 parts of 1-phenyl-3-methyl-5-pyrazolone, 2.5 parts of sodium carbonate and 0.4 part of sodium hydroxide in 100 parts of water, and the mixture is stirred for 4 hours at 0° to 5° C. The pH of the mixture is then adjusted to 7, 25 parts of sodium chloride are added, and the precipitated dyestuff is filtered off, washed with a 10% aqueous solution of sodium chloride, and dried.

When applied to woollen textile materials from a neutral or weakly acid dyebath the dyestuff yields yellow shades which possess excellent fastness to light and to wet treatments.

The following table gives further examples of new dyestuffs of the invention which are obtained when the 1.74 parts of 1-phenyl-3-methyl-5-pyrazolone used in Example 68 are replaced by equivalent amounts of the coupling components listed in the second column of the table. The third column of the table lists the shades obtained when the resulting dyestuffs are applied to woollen textile materials.

| Example | Coupling Component | Shade |
|---|---|---|
| 69 | Acetoacet-4-(acryloylamino)anilide | Greenish-yellow. |
| 70 | 1-(4'-acryloylaminophenyl)-3-methyl-5-pyrazolone. | Yellow. |
| 71 | 1-phenyl-3-carboxy-5-pyrazolone | Do. |
| 72 | 1-phenyl-3-methyl-5-aminopyrazole | Do. |
| 73 | 1-(3'-sulphamylphenyl)-3-methyl-5-pyrazolone. | Do. |
| 74 | Acetocet-o-anisidide | Greenish-yellow. |
| 75 | Acetoacet-o-chloranilide | Do. | destroyed by the addition of sulphamic acid, and the mixture is then neutralised to Congo red by the addition of sodium acetate. The resulting mixture is added to a solution of 2.4 parts of the sodium salt of 2-acryloylamino-8-naphthol-6-sulphonic acid in 100 parts of water at 0° to 5° C. The pH of the mixture is adjusted to 7 and the mixture then stirred at 0° to 5° C. for 16 hours. The resulting dyestuff is then filtered off. The dyestuff is dissolved in a mixture of 1000 parts of water and 160 parts of acetone, the solution is filtered and the resulting filtrate is treated with 100 parts of sodium chloride. The precipitated dyestuff is then filtered off and dried. When applied to wool from a neutral or weakly acid dyebath the dyestuff yields yellowish-red shades possessing excellent fastness to wet treatments and to light.

The following table gives further examples of the dyestuffs of the invention which are obtained when the amines listed in the second column of the table are diazotised and coupled with the coupling components listed in the third column of the table by methods similar to those described in Examples 76 and 77. The fourth column of the table lists the shades obtained when the resulting dyestuffs are applied to woollen textile materials.

| Example | Amine | Coupling Component | Shade |
|---|---|---|---|
| 78 | 4-amino-2:4'-bis(acryloylamino)-diphenylamine | 2-acryloylamino-8-naphthol-6-sulphonic acid | Yellowish red. |
| 79 | 2-amino-4:4'-bis(acryloylamino)-5:5'-dimethyldiphenyl | 2-acryloylamino-5-naphthol-7-sulphonic acid | Red. |
| 80 | 2-amino-4:4'-bis(acryloylamino)-diphenyl | 1-(4':8'-disulphonaphth-2-yl)-3-methyl-5-pyrazolone | Reddish-yellow. |
| 81 | do | Acetoacetanilide-4-sulphonic acid | Yellow. |
| 82 | do | 1-(2'-chloro-6'-methyl-4'-sulphophenyl)-3-methyl-5-pyrazolone. | Reddish-yellow. |
| 83 | do | 1-acryloylamino-8-naphthol-3:6-disulphonic acid | Bluish-red. |
| 84 | do | 2-acryloylamino-5-naphthol-7-sulphonic acid | Scarlet. |
| 85 | do | 2-naphthol-6-sulphonic acid | Yellowish-red. |
| 86 | do | 2-naphthol-6:8-disulphonic acid | Do. |
| 87 | do | 1-naphthol-4-sulphonic acid | Do. |
| 88 | do | 1-naphthol-3:5:7-trisulphonic acid | Reddish-orange. |
| 89 | do | 1-(4'-acryloylamino-3'-sulphophenyl)-3-carboxy-5-pyrazolone. | Golden orange. |
| 90 | 2-amino-4:4'-bis(acryloylamino)-5:5'-dimethyldiphenyl | 1-(3'-acryloylamino-4'-sulphophenyl)-3-methyl-5-aminopyrazole. | Greenish-yellow. |
| 91 | do | 1-amino-2-(4'-nitrophenylazo)-8-naphthol-3:6-disulphonic acid. | Greenish-blue. |

Example 76

A solution of 2 parts of 2-amino-4:4'-bis(acryloylamino)-5:5'-dimethyldiphenyl in 20 parts of acetic acid is added to a mixture of 6 parts of concentrated aqueous hydrochloric acid, 20 parts of ice and 150 parts of water. 4 parts of a 2N aqueous solution of sodium nitrite are then added and the resulting mixture is stirred at 0° to 5° C. for ½ hour. Excess nitrous acid is then destroyed by the addition of sulphamic acid and the mixture is neutralised to Congo red by the addition of sodium acetate. The resulting mixture is then added to a solution of 1.85 parts of the sodium salt of 1-(4'-methyl-2'-sulphophenyl)-3-methyl-5-pyrazolone in 200 parts of water at 0° to 5° C., and the pH of the mixture is adjusted to 8 by the addition of an aqueous solution of sodium hydroxide, 160 parts of acetone are then added, and the mixture is stirred at 0° to 5° C. for 4 hours. The pH of the mixture is then adjusted to 7, 80 parts of sodium chloride are added, and the precipitated dyestuff is filtered off, washed with a 10% aqueous solution of sodium chloride and dried. When applied to wool from a neutral or weakly acid dyebath the dyestuff yields reddish-yellow shades possessing excellent fastness to light and to wet treatments.

Example 77

A solution of 2 parts of 2-amino-4:4'-bis(acryloylamino)-diphenyl in 15 parts of glacial acetic acid is added to a mixture of 30 parts of ice and 100 parts of water. 6 parts of a concentrated aqueous solution of hydrochloric acid are then added, followed by 4 parts of a 2N aqueous solution of sodium nitrite. The mixture is then stirred at 0° to 5° C. for ½ hour, excess nitrous acid is

Example 92

A solution of 5.8 parts of 5-nitro-2-aminobenzene sulphon(4'-acetylamino)anilide in 100 parts of hot acetic acid is poured into a mixture of 50 parts of ice, 11 parts of a concentrated aqueous solution of hydrochloric acid and 200 parts of water, and 20 parts of a N aqueous solution of sodium nitrite are then added. The resulting mixture is stirred for 30 minutes at 0° to 5° C., and sulphamic acid is then added to destroy any nitrous acid still present. A solution of 5.6 parts of the sodium salt of 2-amino-8-naphthol-6-sulphonic acid in 200 parts of water is then added, the pH of the mixture adjusted to 4, and the mixture stirred for 4 hours at 0° to 5° C. A concentrated aqueous solution of ammonia is added until the pH of the mixture is 8, the mixture is heated to 90° C., and a solution of 8.2 parts of crystalline sodium sulphide in 30 parts of water added. The mixture is then stirred for 1 hour, cooled to 60° C., and the precipitated solid filtered off and washed with a 5% aqueous solution of sodium chloride. The solid is then dissolved in a solution of 12 parts of sodium hydroxide in 250 parts of water, and the solution heated for 3 hours at 80° to 85° C. The solution is then cooled to 20° C., acidified with acetic acid, and the precipitated solid is filtered off. The solid is dissolved in a mixture of 280 parts of water and 200 parts of acetone and 22 parts of acryloyl chloride are then added during 1 hour, the temperature of the resulting mixture being maintained between 0° and 5° C., and the pH of the mixture being maintained at 6 to 7 by the addition of a 10% aqueous solution of sodium carbonate. The mixture is then stirred for 3 hours at 2° C., 40 parts of sodium chloride are added and, after removal of the acetone, the precipitated dyestuff is filtered off and dried.

When applied to wool from a neutral or slightly acid dyebath the dyestuff gives bluish-red shades possessing excellent fastness to wet treatments and to light.

Example 93

In place of the 5.6 parts of the sodium salt of 2-amino-8-naphthol-6-sulphonic acid used in the above example there are used 6.9 parts of the sodium salt of 1-anilinonaphthalene-8-sulphonic acid whereby a dyestuff is obtained which dyes wool in bluish-red shades possessing excellent fastness to light and to wet treatments.

Example 94

In place of the 22 parts of acryloyl chloride used in Examples 92 or 93 there are used 30 parts of α-chloro-acryloyl chloride when similar dyestuffs are obtained.

2-amino-4:4′-bis(acryloylamino)-5:5′-dimethyldiphenyl,
2-amino-4:4′-bis(acryloylamino)-5:5′-dimethoxydiphenyl,
2-amino-4:4′-bis(acryloylamino)diphenylmethane,
2-amino-4,4′-bis-(acryloylamino)stilbene,
4-amino-2:4′-bis(acryloylamino)-diphenylamine,
2-amino-4-acryloylaminostilbene,
3-amino-5-acryloylaminobenzanilide,
3-amino-5-acryloylaminobenz-N-ethylanilide,
2-amino-4-acryloylaminobenzanilide,
2-amino-4-acryloylaminobenz-N-ethylanilide,
2-amino-4:4′-bis(acryloylamino)-benzanilide,
3-amino-5-acryloylamino-2′:4′:6′-trimethylbenzophenone,
2-amino-4-acryloylaminobenzenesulphon-N-ethylanilide,
2-amino-4-acryloylaminobenzenesulphon-N-ethyl-3′-sulphoanilide and
2-amino-4-acryloylaminobenzenesulphon-N-methyl-3′-sulphoanilide used in the above examples may be obtained by methods similar to that described in Example 1 for 2-amino-4:4′-bis(acryloylamino)diphenyl starting from the appropriate nitroamine or nitrodiamino compounds.

What we claim is:

The azo dyestuffs of the formula

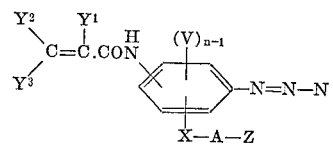

wherein $Y^1$, $Y^2$ and $Y^3$ are independently selected from the class consisting of hydrogen and chlorine atoms; V represents a radical selected from the class consisting of lower alkyl and lower alkoxy radicals; n represents a positive integer not exceeding 2; X is selected from the class consisting of a direct link and $-CH_2CH_2-$, $-CH=CH-$, $-CH_2-$, $-O-$, $-CO-$, $-CON-$
$\phantom{-CH_2CH_2-, -CH=CH-, -CH_2-, -O-, -CO-, -CON}|$
$\phantom{-CH_2CH_2-, -CH=CH-, -CH_2-, -O-, -CO-, -CO N}R'$ $-SO_2N-$ and $-N-$
$\phantom{-SO_2N}|\phantom{ and -N}|$
$\phantom{-SO_2N}R'\phantom{ and -N}R'$ and wherein R′ is selected from the class consisting of hydrogen and lower alkyl; A represents a phenylene radical and any substituents on said phenylene radical are selected from the class consisting of methyl, methoxy, chlorine, bromine and sulphonic acid; Z is selected from the class consisting of hydrogen and

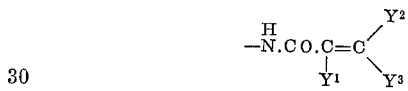

E represents the residue of a coupling component selected from the class consisting of residues of coupling components of the phenol, naphthol, acetoacetanilide, naphthylamine, 5-aminopyrazole and 5-pyrazolone coupling components; at least one of A and E containing at least one group selected from the class consisting of sulphonic acid and carboxylic acid groups.

References Cited by the Examiner

UNITED STATES PATENTS 3,098,063    7/63    Eisele et al. _____ 260—163

FOREIGN PATENTS 211,447    10/60    Austria.
858,183    1/61    Great Britain.

CHARLES B. PARKER, *Primary Examiner.*